US 12,090,730 B2

(12) United States Patent
Gima (10) Patent No.: US 12,090,730 B2
(45) Date of Patent: Sep. 17, 2024

(54) LAMINATED GLASS

(71) Applicant: AGC Inc., Tokyo (JP)

(72) Inventor: Yuhei Gima, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 18/219,880

(22) Filed: Jul. 10, 2023

(65) Prior Publication Data
US 2023/0347626 A1    Nov. 2, 2023

Related U.S. Application Data

(63) Continuation of application No. PCT/JP2022/000666, filed on Jan. 12, 2022.

(30) Foreign Application Priority Data

Jan. 13, 2021  (JP) .................. 2021-003539

(51) Int. Cl.
  *G02F 1/1333* (2006.01)
  *B32B 7/023* (2019.01)
  *B32B 17/10* (2006.01)
  *B60J 1/00* (2006.01)
  (Continued)

(52) U.S. Cl.
  CPC ........ *B32B 17/10504* (2013.01); *B32B 7/023* (2019.01); *B32B 17/10036* (2013.01);
  (Continued)

(58) Field of Classification Search
  CPC .............. B32B 17/10504; B32B 7/023; B32B 17/10036; B32B 17/10174;
  (Continued)

(56) References Cited

U.S. PATENT DOCUMENTS

2009/0115922 A1* 5/2009 Veerasamy ......... C03C 17/3681
                                                              349/16
2019/0255812 A1  8/2019 Bard et al.
2021/0016640 A1  1/2021 Manz et al.

FOREIGN PATENT DOCUMENTS

JP          3296096 B2     6/2002
JP       2013-148744 A     8/2013
            (Continued)

OTHER PUBLICATIONS

JP 2009036967 A (Year: 2009).*
(Continued)

*Primary Examiner* — James A Dudek
(74) *Attorney, Agent, or Firm* — Foley & Lardner LLP (57) ABSTRACT

Laminated glass for vehicles comprising an interior glass plate and an exterior glass plate, an interlayer film between the interior glass plate and the exterior glass plate, and a light control element sealed in the interlayer film, wherein the light control element has a pair of substrates and a light control layer between the pair of substrates, and the interlayer film includes an interior portion on the vehicle-interior side of the light control layer, and an exterior portion on the vehicle-exterior side of the light control layer, when the transmittance of the exterior glass plate, the exterior portion of the interlayer film, and the substrate on the vehicle-exterior side, of the light control layer, is Tout, and the transmittance of the interior glass plate, the interior portion of the interlayer film, and the substrate on the vehicle-interior side, of the light control layer, is Tin, a relation Tout<Tin is satisfied.

63 Claims, 3 Drawing Sheets

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| T1 | 86 | 86 | 86 | 86 | 86 | 40 | 86 | 40 |
| T2 | 18 | 89 | 18 | 89 | 8 | 89 | 89 | 18 |
| T3 | 90 | 90 | 90 | 90 | 90 | 90 | 50 | 90 |
| T4 | 90 | 90 | 90 | 90 | 90 | 90 | 90 | 90 |
| T5 | 89 | 89 | 18 | 18 | 89 | 89 | 89 | 89 |
| T6 | 86 | 86 | 86 | 86 | 86 | 86 | 86 | 40 |
| Tout | 13.9 | 68.9 | 13.9 | 68.9 | 6.2 | 32 | 38.3 | 6.5 |
| Tin | 68.9 | 68.9 | 13.9 | 13.9 | 68.9 | 68.9 | 68.9 | 32.0 |
| Evaluation of reflection distortion | Excellent | Poor | Excellent | Poor | Excellent | Good | Good | Excellent |
| Total light transmittance T of laminated glass | 7.9 | 43.5 | 1.3 | 6.7 | 3.7 | 19.6 | 23 | 1.8 |
| Visible light reflectance Rin on vehicle-interior surface | 4.4 | 4.4 | 4.1 | 4.1 | 4.4 | 4.4 | 4.4 | 2.0 |
| T/Rin | 1.8 | 9.9 | 0.3 | 1.6 | 0.8 | 4.5 | 5.2 | 0.9 |
| Evaluation of contrast | Excellent | Good | Poor | Excellent | Excellent | Good | Good | Excellent |

(51) Int. Cl.
  *B60J 3/00* (2006.01)
  *G02F 1/1334* (2006.01)
  *G02F 1/137* (2006.01)

(52) U.S. Cl.
  CPC .. *B32B 17/10174* (2013.01); *B32B 17/10678* (2013.01); *B32B 17/10761* (2013.01); *B32B 17/10779* (2013.01); *B60J 1/001* (2013.01); *B60J 3/007* (2013.01); *G02F 1/133302* (2021.01); *G02F 1/1334* (2013.01); *G02F 1/13725* (2013.01); *B32B 2307/202* (2013.01); *B32B 2307/412* (2013.01); *B32B 2307/414* (2013.01); *B32B 2307/7376* (2023.05); *B32B 2605/006* (2013.01); *G02F 2203/01* (2013.01)

(58) Field of Classification Search
  CPC ........ B32B 17/10678; B32B 17/10761; B32B 17/10779; B32B 2307/202; B32B 2307/412; B32B 2307/414; B32B 2307/7376; B32B 2605/006; B60J 1/001; B60J 3/007; G02F 1/133302; G02F 1/1334; G02F 1/13725
  See application file for complete search history.

(56) References Cited

FOREIGN PATENT DOCUMENTS

| JP | 2018-040883 A | 3/2018 |
| JP | 2018-537379 A | 12/2018 |
| JP | 2019-094220 A | 6/2019 |
| JP | 2020-052374 A | 4/2020 |

OTHER PUBLICATIONS

International Searching Authority, "International Search Report," issued in connection with International Patent Application No. PCT/JP2022/000666, dated Mar. 22, 2022.

International Searching Authority, "Written Opinion," issued in connection with International Patent Application No. PCT/JP2022/000666, dated Mar. 22, 2022.

"PCT Third Party Observation," Anonymously submitted to the International Bureau of WIPO in International Patent Application No. PCT/JP2022/000666, dated May 1, 2023.

* cited by examiner

| | Ex. 1 | Ex. 2 | Ex. 3 | Ex. 4 | Ex. 5 | Ex. 6 | Ex. 7 | Ex. 8 |
|---|---|---|---|---|---|---|---|---|
| T1 | 86 | 86 | 86 | 86 | 86 | 40 | 86 | 40 |
| T2 | 18 | 89 | 18 | 89 | 8 | 89 | 89 | 18 |
| T3 | 90 | 90 | 90 | 90 | 90 | 90 | 50 | 90 |
| T4 | 90 | 90 | 90 | 90 | 90 | 90 | 90 | 90 |
| T5 | 89 | 89 | 18 | 18 | 89 | 89 | 89 | 89 |
| T6 | 86 | 86 | 86 | 86 | 86 | 86 | 86 | 40 |
| Tout | 13.9 | 68.9 | 13.9 | 68.9 | 6.2 | 32 | 38.3 | 6.5 |
| Tin | 68.9 | 68.9 | 13.9 | 13.9 | 68.9 | 68.9 | 68.9 | 32.0 |
| Evaluation of reflection distortion | Excellent | Poor | Excellent | Poor | Excellent | Good | Good | Excellent |
| Total light transmittance T of laminated glass | 7.9 | 43.5 | 1.3 | 6.7 | 3.7 | 19.6 | 23 | 1.8 |
| Visible light reflectance Rin on vehicle-interior surface | 4.4 | 4.4 | 4.1 | 4.1 | 4.4 | 4.4 | 4.4 | 2.0 |
| T/Rin | 1.8 | 9.9 | 0.3 | 1.6 | 0.8 | 4.5 | 5.2 | 0.9 |
| Evaluation of contrast | Excellent | Good | Poor | Excellent | Excellent | Good | Good | Excellent |

LAMINATED GLASS

This application is a continuation of PCT Application No. PCT/JP2022/000666, filed on Jan. 12, 2022, which is based upon and claims the benefit of priority from Japanese Patent Application No. 2021-003539 filed on Jan. 13, 2021. The contents of those applications are incorporated herein by reference in their entireties.

TECHNICAL FIELD

The present invention relates to laminated glass.

BACKGROUND ART

Laminated glass having a light control element sealed in an interlayer film is known as window glass for automobiles and railroads, where the transmittance can be changed by electricity. In order to improve the privacy of passengers, such laminated glass, for example, becomes like sliding glass by scattering light when the light control element is off, and becomes transparent when the light control element is on. As the light control element, for example, a liquid crystal device is used (see, for example, Patent Document 1).

PRIOR ART DOCUMENT

Patent Document

Patent Document 1: Japanese Patent No. 3296096

DISCLOSURE OF INVENTION

Technical Problem

However, laminated glass having a light control element sealed in has a problem that the surface of the light control element becomes uneven inside the laminated glass, which causes reflection distortion and deteriorates the appearance seen from the outside of the vehicle.

The present invention has been made in view of the above-mentioned points, and is intended to suppress the deterioration of the appearance of laminated glass having a light control element sealed in it, as seen from the outside of the vehicle.

Solution to Problem

The present laminated glass is laminated glass for vehicles comprising an interior glass plate and an exterior glass plate, an interlayer film located between the interior glass plate and the exterior glass plate, and a light control element sealed in the interlayer film, wherein the light control element has a pair of substrates and a light control layer located between the pair of substrates. The interlayer film includes an interior portion located on the vehicle-interior side, of the light control layer and an exterior portion located on the vehicle-exterior side, of the light control layer, wherein when the transmittance of the exterior glass plate, the exterior portion of the interlayer film, and the substrate located on the vehicle-exterior side, of the light control layer, is Tout, and the transmittance of the interior glass plate, the interior portion of the interlayer film, and the substrate located on the vehicle-interior side, of the light control layer, is Tin, the relation of Tout<Tin is satisfied.

Advantageous Effects of Invention

According to one embodiment of the disclosure, it is possible to suppress the deterioration of the appearance of laminated glass having a light control element sealed in it, as seen from the outside of the vehicle.

DESCRIPTION OF EMBODIMENTS

In the following, embodiments of the present invention will be described with reference to the drawings. In the respective drawings, the same symbols are attached to the same constituent parts, and duplicate explanations may be omitted. In addition, in the respective drawings, the size and shape of some parts may be exaggerated to facilitate understanding of the contents of the present invention.

The term "vehicle" refers typically to an automobile, but generally to a mobile body having glass, including a train, a ship, an aircraft, etc.

Further, the plan view refers to the view of a given area of laminated glass from the normal direction of the vehicle-interior side surface of the laminated glass, and the plane shape refers to the shape of a given area of laminated glass from the normal direction of the vehicle-interior side surface of the laminated glass.

First Embodiment

Figure 1A:
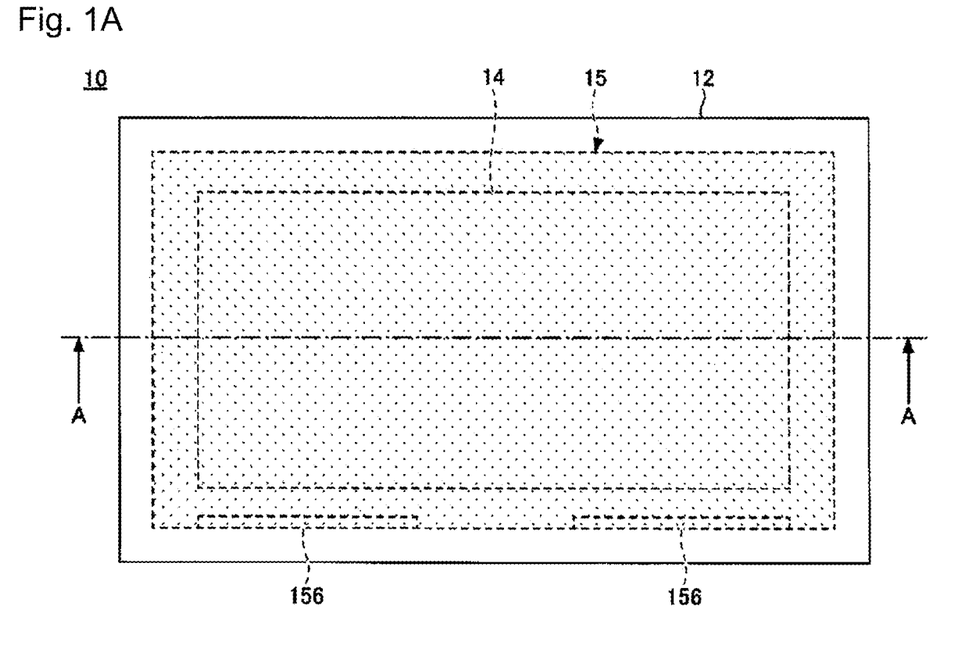
FIG. 1A is a diagram illustrating the laminated glass according to the first embodiment.
Figure 1B:
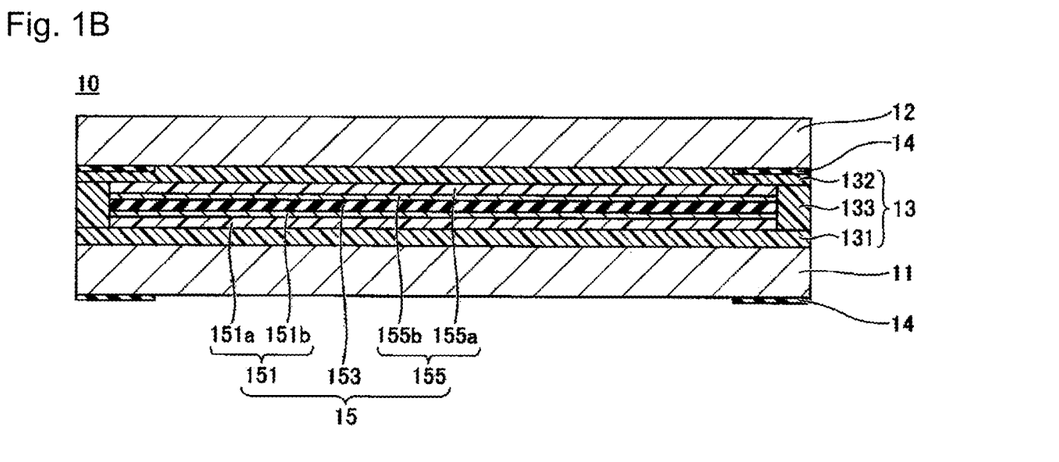
FIG. 1B is a diagram illustrating the laminated glass according to the first embodiment.

FIGS. 1A and 1B are views illustrating laminated glass according to the first embodiment. FIG. 1A schematically illustrates the state where the laminated glass is installed in a vehicle and viewed from the outside to the inside of the vehicle. FIG. 1B is a cross-sectional view along the A-A line in FIG. 1A.

Referring to FIGS. 1A and 1B, laminated glass 10 is laminated glass for vehicles comprising a glass plate 11, a glass plate 12, an interlayer film 13, a shielding layer 14 and a light control element 15. However, the shielding layer 14 is provided as the case requires.

Here, in FIGS. 1A and 1B, the laminated glass 10 is shown as a flat plate, but the laminated glass 10 can be curved in the longitudinal and shortitudinal directions. Alternatively, the laminated glass 10 can be curved only in the longitudinal direction or only in the shortitudinal direction.

Further, in FIGS. 1A and 1B, the planar shape of the laminated glass 10 is rectangular, but the planar shape of the laminated glass 10 is not limited to a rectangular shape and can be any shape including a trapezoidal shape.

The laminated glass 10 can be applied, for example, to vehicle roof glass, rear glass, rear side glass, rear quarter glass, door glass, extra glass, windshield, etc. Here, extra glass is glass that is installed on the rear side of a vehicle to improve the rear visibility of the driver of the vehicle.

The glass plate 11 is the interior glass plate, which becomes to be on the vehicle-interior side when the laminated glass 10 is installed in the vehicle. Further, the glass plate 12 is the exterior glass plate which becomes to be on the vehicle-exterior side when the laminated glass 10 is installed in a vehicle. The glass plate 11 and the glass plate 12 may have a predetermined curvature.

The glass plate 11 and the glass plate 12 are a pair of glass plates facing each other, and the interlayer film 13 and the light control element 15 are located between the pair of glass plates. The glass plate 11 and the glass plate 12 are fixed to each other in such a state that the interlayer film 13 and the light control element 15 are sandwiched between them.

The interlayer film 13 is a film that joins glass plate 11 and glass plate 12. The interlayer film 13 has, for example, an interlayer film 131 bonding to the glass plate 11, an interlayer film 132 bonding to the glass plate 12, and a frame-shaped interlayer film 133 located between the interlayer film 131 and the interlayer film 132 to surround the outer circumference of the light control element 15. In the interlayer film 13, the interlayer film 131 is the interior portion located on the vehicle-interior side to the light control layer 153, and the interlayer film 132 is the exterior portion located on the vehicle-exterior side to the light control layer 153.

However, the interlayer film 13 has an interlayer film 131 bonding to the glass plate 11 and an interlayer film 132 bonding to the glass plate 12, and may not have an interlayer film 133. Even in a case where the interlayer film 13 does not have an interlayer film 133, the outer circumference of the light control element 15 is surrounded by the interlayer films 131 and/or 132 at the time of compression bonding in the production process of the laminated glass 10.

Here, in a case where there is no need to distinguish between interlayer films 131, 132 and 133, they are simply referred to as interlayer film 13. The details of glass plate 11, glass plate 12 and interlayer film 13 will be described later.

The shielding layer 14 is an opaque layer, and, for example, is provided in a strip along the periphery of the laminated glass 10. The shielding layer 14 is, for example, an opaque (e.g. black) colored ceramic layer. The shielding layer 14 may be a light-shielding colored interlayer or a colored film, or a combination of at least one of them and a colored ceramic layer. The colored film may be integrated with an infrared reflective film or the like.

Since the laminated glass 10 has an opaque shielding layer 14, it is possible to suppress deterioration of a resin such as urethane that holds the periphery of the laminated glass 10 to the car body by ultraviolet rays. Further, the shielding layer 14 can hide electrodes electrically connected to the light control element 15 and wirings connected to the electrodes so that they are not easily visible from the vehicle-exterior side and/or the vehicle-interior side.

The shielding layer 14 can be formed, for example, by applying a ceramic color paste containing fusible glass frit containing a black pigment on a glass plate by screen printing, etc., followed by baking, but not limited thereto. The shielding layer 14 may be formed, for example, by applying an organic ink containing a black or dark pigment on a glass plate by screen printing, etc., followed by drying it.

In the example in FIGS. 1A and 1B, the shielding layer 14 is provided on the periphery of the vehicle-interior side surface of the glass plate 11 and the periphery of the vehicle-interior side surface of the glass plate 12. However, the shielding layer 14 may be provided, as the case requires, only on the periphery of the vehicle-interior side surface of the glass plate 11, or only on the periphery of the vehicle-interior side surface of the glass plate 12.

The light control element 15 is an element that can switch the light transmittance of the laminated glass 10. The light control element 15 may, for example, switch between a low transmittance state and a high transmittance state. The transmittance may be switched in multiple steps or continuously. The light control element 15 may be placed on the entire laminated glass 10 or only on a part of it, as the case requires. The planar shape of the light control element 15 is, for example, a rectangle smaller than the planar shape of the laminated glass 10. In the example in FIGS. 1A and 1B, the periphery of the light control element 15 is located at a position which overlaps in plan view with the shielding layer 14.

The light control element 15 comprises a substrate 151, a light control layer 153, a substrate 155 and a pair of electrodes 156, and is sealed in the interlayer film 13. That is, the light control element 15 has its periphery surrounded by the interlayer film 13. The substrate 151 has a supporting member 151a and a conductive film 151b disposed on the supporting member 151a. The substrate 155 has a supporting member 155a and a conductive film 155b disposed on the supporting member 155a.

The shape of the light control element 15 is, for example, film-like. The thickness of the light control element 15 is, for example, at least 0.05 mm and at most 0.5 mm, and preferably at least 0.1 mm and at most 0.4 mm. Here, each of the pair of electrodes 156 of the light control element 15 is connected to a wiring (not shown) for connecting the electrodes 156 to an external circuit.

The supporting members 151a and 155a are transparent resin layers. The thickness of the supporting members 151a and 155a is, for example, at least 5 μm and at most 500 μm, preferably at least 10 μm and at most 200 μm, and more preferably at least 50 μm and at most 150 μm.

The supporting members 151a and 155a are, for example, any selected from the group consisting of polyethylene terephthalate, polyethylene naphthalate, polyamide, polyether, polysulfone, polyethersulfone, polycarbonate, polyarylate, polyetherimide, polyether ether ketone, polyimide, aramid, polybutylene terephthalate, triacetyl cellulose, polyurethane and cyclo-olefin polymers.

The conductive film 151b is formed on the glass plate 12 side surface of the supporting member 151a, and is in contact with the glass plate 11 side surface of the light control layer 153. The conductive film 155b is formed on the glass plate 11 side surface of the supporting member 155a, and is in contact with the glass plate 12 side surface of the light control layer 153. That is, the conductive films 151b and 155b are a pair of conductive films sandwiching the light control layer 153.

As conductive films 151b and 155b, for example, transparent conductive oxide (TCO: transparent conductive oxide) can be used. As TCO, for example, tin-doped indium oxide (ITO), aluminum doped zinc oxide (AZO) and indium doped cadmium oxide may be mentioned, but not limited thereto.

As conductive films 151b and 155b, a transparent conductive polymer such as poly(3,4-ethylenedioxythiophene) (PEDOT) or poly(4,4-dioctylcyclopentadithiophene) may suitably be used. Also, as conductive films 151b and 155b, laminated films of a metal layer and a dielectric layer, silver nanowires, silver or copper metal meshes, etc. may suitably be used.

The conductive films 151b and 155b may be formed, for example, by using a physical vapor deposition (PVD) method such as a sputtering method, a vacuum deposition method or an ion plating method, a chemical vapor deposition (CVD) method, or a wet-coating method.

A transparent barrier layer may further be applied to the surface of the conductive films 151b and 155b. The barrier layer mainly contributes to improve the adhesion with the light control layer 153 and to prevent short-circuiting of the light control element. As the material for the barrier layer, for example, $SiO_2$, SiN, urethane, urethane acrylate or acrylic material may be used, but not limited thereto. The thickness of the barrier layer is preferably at most 1,000 nm, more preferably at most 500 nm and further preferably at most 300 nm. The barrier layer may be formed, for example, by a physical vapor deposition (PVD) method such as a sputtering method, a vacuum deposition method or an ion plating method, a chemical vapor deposition (CVD) method, or a wet coating method.

The light control layer 153 is located between the supporting member 151*a*, on which the conductive film 151*b* is formed, and the supporting member 155*a*, on which the conductive film 155*b* is formed. The light control layer 153 is any one selected from the group consisting of suspended particle device (SPD), polymer dispersed liquid crystal (PDLC), polymer network liquid crystal (PNLC), guest-host type liquid crystal, TN (Twisted Nematic) liquid crystal, PC (Phase Change type liquid crystal, STN (Super Twisted Nematic) type liquid crystal, ECB (Electrically Controlled Birefringence) type liquid crystal, OCB (Optically Compensated Bend) type liquid crystal, IPS (In-Place Switching) type liquid crystal, VA (Vertical Alignment) type liquid crystal, FFS (Fringe Field Switching) type liquid crystal, FPA (Field-induced Photo-reactive Alignment) type liquid crystal, photochromic device, electrochromic device, electrokinetic device, organic EL (Electro-Luminescence) and inorganic EL. The light control layer 153 may be any one selected from the group consisting of SPD, PDLC, PNLC, guest-host type liquid crystal, and electrochromic device, any one selected from the group consisting of SPD, PDLC, guest-host type liquid crystal and electrochromic device, or any one selected from the group consisting of SPD, PDLC, and guest-host type liquid crystal.

The haze of the light control element 15 is preferably at least 80% in such a state that the transmittance of the light control element 15 is the lowest. This value can be achieved, for example, by using polymer dispersed liquid crystal (PDLC) as the light control layer 153. Here, the haze can be measured in accordance with JIS K 7136.

Here, the guest-host type liquid crystal is a mixture of a dichroic dye and a liquid crystal with anisotropic light absorption between the long-axis and short-axis directions of the molecules. The dichroic dye has a single optical absorption axis and absorbs only light vibrating in the direction of the optical absorption axis. Therefore, by changing the orientation of the dichroic dye in accordance with the movement of the liquid crystal due to an electric field, and by controlling the direction of the light absorption axis, the transmission state of the liquid crystal cell can be changed.

The electrodes 156 are disposed, for example, at positions overlapping with the shielding layer 14 in plan view. One of the pair of electrodes 156 is electrically connected to the conductive film 151*b*, and the other is electrically connected to the conductive film 155*b*. The light control layer 153 is driven when the conductive films 151*b* and 155*b* are energized.

One electrode of the pair of electrodes 156 is, for example, a positive electrode, and is connected to the positive side of a power source such as a battery installed in a vehicle, via a lead wire or the like. The other electrode of the pair of electrodes 156 is, for example, a negative electrode, and is connected to the negative side of a power source such as a battery installed in the vehicle, via a lead wire or the like.

When a voltage is supplied to the light control layer 153 via a pair of electrodes 156 from a power source such as a battery, the transmittance of the light control element 15 switches according to the voltage. From the viewpoint of improving contrast, the total light transmittance when the transmittance of the laminated glass 10 is at its lowest (i.e. in a state where the transmittance of the light control element 15 is at its lowest) is preferably from 2% to 10%.

When the total light transmittance of the laminated glass 10 in a state where the transmittance of the light control element 15 is at its lowest, is T and the visible light reflectance at the vehicle-interior surface of the glass plate 11 is Rin, it is preferred that the relation of $0.5<T/Rin<10$ is satisfied. If the relation of $0.5<T/Rin$ is satisfied, the effect of the reflection at the vehicle-interior surface to transmitted light is small, and the contrast can be further improved. Further, if the relation of $T/Rin<10$ is satisfied, an excellent light shielding property is obtainable. It is more preferred that the relation of $T/Rin<2$ is satisfied, since a further excellent light shielding property is obtainable.

Figure 2:
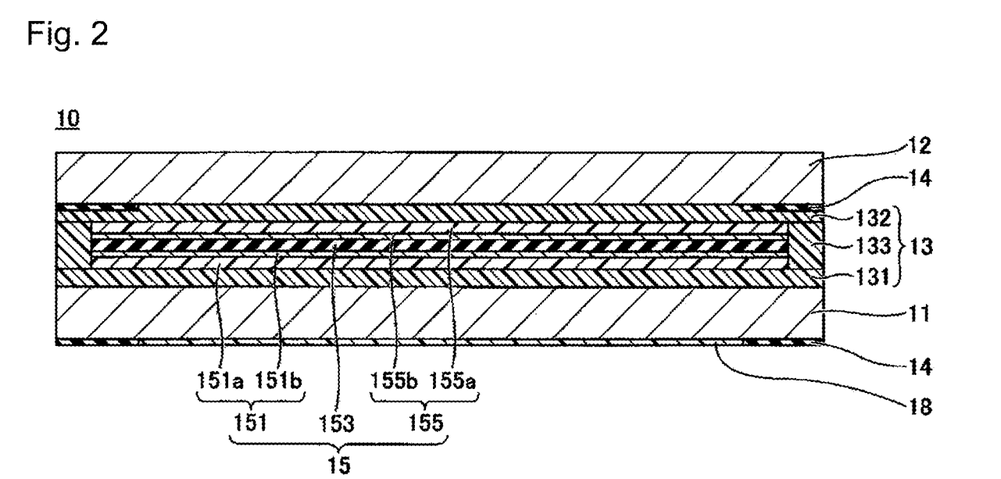
FIG. 2 is an illustration of a low-emissive coating.

Further, the visible light reflectance Rin is preferably less than 2.5%. For example, as shown in FIG. 2, the visible light reflectance Rin can be lowered by providing a low-emissive coating 18 on the vehicle-interior side surface of the glass plate 11. As the low-emissive coating 18, for example, a tin-doped indium oxide (ITO) may be mentioned. By lowering the visible light reflectance Rin, the contrast can be further improved. That is, when the total light transmittance T of the laminated glass 10 is low, the reflection from the vehicle-interior surface side becomes dominant, and the contrast can be improved by reducing the visible light reflectance Rin. Here, the total light transmittance can be measured by a method in accordance with JIS K 7361-1: 1997. Further, the visible light reflectance Rin can be measured by a method in accordance with JIS R 3106:1998.

The material for electrodes 156 is not particularly restricted so long as it is a conductive material, and, for example, a metal material may be mentioned. As an example of the metal material, gold, silver, copper, aluminum, tungsten, platinum, palladium, nickel, cobalt, titanium, iridium, zinc, magnesium or tin may be mentioned. These metals may be plated or may be constituted to be an alloy or a composite with a resin.

For the electrodes 156 from the viewpoint of cost and availability, a copper ribbon or flat woven copper wire, or FPC (Flexible Printed Circuit), can be suitably used. The copper ribbon or flat woven copper wire may be plated with a metal other than copper.

The electrodes 156 can be bonded to the conductive films 151*b* and 155*b* by any of conductive adhesive material (conductive adhesive layer), anisotropic conductive film, or solder. Alternatively, the electrodes 156 can be directly connected to the conductive films 151*b* and 155*b* without via any conductive adhesive material, anisotropic conductive film, or solder. Otherwise, the electrodes 156 may be formed by a printing system such as screen printing, inkjet printing, offset printing, flexographic printing, or gravure printing.

In the laminated glass 10, the relation of Tout<Tin is satisfied, when the transmittance of glass plate 12, interlayer film 132 and substrate 155 is Tout, and the transmittance of glass plate 11, interlayer film 131 and substrate 151 is Tin. Here, the transmittance of the interlayer film in this specification is the value measured in such a state that the interlayer film is sandwiched between two pieces of 2 mm-thick clear glass to form a laminated glass. Further, the transmittance of a glass plate is, if the glass plate has a coating film, the transmittance including the coating film. The transmittance of the substrate is the transmittance including the supporting member and the conductive film.

Here, since Tin cannot be measured directly, for convenience, it is the numerical value obtained by multiplying the total light transmittance of the glass plate 11, the total light transmittance of the interlayer film 131, and the total light transmittance of the substrate 151. Similarly, Tout is a numerical value obtained by multiplying the total light transmittance of the glass plate 12, the total light transmittance of the interlayer film 132, and the total light transmittance of the substrate 155.

In order to realize the relation of Tout<Tin, for example, the transmittance of the interlayer film 132, which is located on the vehicle-exterior side, of the light control layer 153, may be made to be lower than the transmittance of the interlayer film 131, which is located on the vehicle-interior side. Specifically, different materials may be used for the interlayer film 131 and the interlayer film 132 so that the relation of Tout<Tin is satisfied. The transmittance of the interlayer film 131 is preferably at least 80%. For example, as the interlayer film 131, a clear interlayer film may be used, and as the interlayer film 132, a colored interlayer film may be used.

Here, the clear interlayer film is an interlayer film with high transparency. The visible light transmittance of the clear interlayer film is, for example, at a level of from 85% to 95% in a case where the film thickness is 0.38 mm. For example, a product with a thickness of 0.38 mm and a visible light transmittance of 90% is commercially available from Seki-Solutia Japan Ltd.

The colored interlayer film is an interlayer film with lower transparency than the clear interlayer film. The colored interlayer film can be made by coloring the material to be described later in the description of [Interlayer film]. Specifically, a colored interlayer film is obtainable by incorporating a coloring agent to a composition mainly containing a thermoplastic resin. The colored interlayer film may also contain a plasticizer to adjust the glass transition temperature.

The coloring agent is not particularly restricted so long as it is one capable of lowering the visible light transmittance, and a dye, an inorganic pigment, an organic pigment, etc. may be mentioned. Among these, an inorganic pigment or an organic pigment is preferred, because such is less likely to fade by long-term use, and an inorganic pigment is preferred, because it is excellent in light resistance.

As the organic pigment, a black pigment such as aniline black, or a red pigment such as alizarin lake may be mentioned. As the inorganic pigment, a carbon type pigment, or a metal oxide type pigment may be mentioned. For example, a black pigment such as carbon black, ivory black, Mars black, peach black, lamp black or magnetite-type triglyceride, a brown pigment such as amber, Burton amber, yellow ocher, Van Dyke brown, sienna or Barton sienna, a red pigment such as Bengalla, Molybdenum red or Cadmium red, an orange pigment such as Red lead yellow or Chromium vermilion, a blue pigment such as Gun blue, Navy blue, Cobalt blue or Cerulean blue, a green pigment such as Chromium oxide, viridian, emerald green or cobalt green, a yellow pigment such as lead yellow, cadmium yellow, yellow iron oxide or titanium yellow, a purple pigment such as manganese violet or mineral violet, may be mentioned. One of these coloring agents may be used alone, or two or more of them may be used in combination.

The blend amount of the coloring agent may, for example, be such an amount that the visible light transmittance of the interlayer film 132 becomes to be at most 50%. The colored interlayer film may further contain one type, or two or more types of various additives such as infrared absorbers, ultraviolet absorbers, fluorescent agents, adhesion modifiers, coupling agents, surfactants, antioxidants, heat stabilizers, light stabilizers, dehydrating agents, antifoaming agents, antistatic agents, and flame retardants.

A colored interlayer film may be made by a method of forming a dark-colored printing layer on the surface of an uncolored interlayer film 132 to form a colored interlayer film. As the method of forming a dark-colored printed layer, a usual printing method using a colored material on a resin substrate may be applied. As the colored material, an organic pigment or an inorganic pigment similar to the above-described coloring agent may be mentioned. Further, the printed layer in this case does not need to be durable at temperatures near the softening point of glass like the shielding layer made of ceramics, and therefore, it is possible to use, for example, an organic pigment including carbon black. The thickness of the printed layer may be suitably adjusted as the case requires, e.g., to the thickness where the visible light transmittance of the interlayer film 132 becomes to be at most 50%.

Further, by using a colored interlayer film, it is possible to significantly reduce the visible light transmittance of the interlayer film 132. For example, it is possible to reduce the visible light transmittance of the interlayer film 132 to be at most 20%, at most 10%, or at most 5%. For example, a product with a film thickness of 0.76 mm and a visible light transmittance of 18% is commercially available from Sekisui Chemical Co., Ltd. Further, a product with a film thickness of 0.76 mm and a visible light transmittance of 8% is commercially available from Solutia Japan Ltd.

In the laminated glass 10 having a light control element 15, there may be a case where a reflection distortion is caused as the surface of the light control element 15 becomes uneven inside the laminated glass 10, whereby the appearance when viewed from the vehicle-exterior side becomes deteriorated. However, by satisfying the relation of Tout<Tin, the transmittance on the vehicle-exterior side becomes lower and the unevenness becomes less noticeable, whereby it becomes possible to reduce the reflection distortion and to improve the appearance when viewed from the vehicle-exterior side.

Tout is preferably at least 0.01% and at most 20%. Within this range, it is possible to sufficiently obtain the effect of reducing the reflection distortion in the vehicle-exterior view. Further, Tin is preferably at least 30%, more preferably at least 35%, further preferably at least 50% and particularly preferably at least 60%. When Tin is at least 35% and Tout is at least 0.01% and at most 20%, the effect of reducing the reflection distortion in the vehicle-exterior view is sufficiently obtainable and good contrast is obtainable.

Further, since the reflection distortion in the vehicle-interior view is less noticeable as the brightness of the reflected light source is weaker than the vehicle-exterior view, by satisfying the relation of Tout<Tin, it is possible to effectively reduce the reflection distortion in the vehicle-exterior view where the reflection is more noticeable. Further, the difference between Tout and Tin (Tin−Tout) is preferably at least 20%, more preferably at least 30% and further preferably at least 50%. When the difference between Tout and Tin is more than 20%, the contrast reduction can be suppressed while the reflection distortion is reduced.

Here, glass plate 11, glass plate 12 and interlayer film 13 will be described in detail.

[Glass Plates]

Glass plates 11 and 12 may be made of inorganic glass or organic glass. As the inorganic glass, for example, soda-lime glass, aluminosilicate glass, borosilicate glass, alkali-free glass, quartz glass, etc. may be used without any particular restrictions. For the glass plate 12 located outside the laminated glass 10, inorganic glass is preferred from the viewpoint of scratch resistance, and soda-lime glass is preferred from the viewpoint of formability. When glass plate 11 and glass plate 12 are soda-lime glass, clear glass, green glass containing at least a predetermined amount of iron component and UV-cut green glass may be suitably used.

The inorganic glass may be either untoughened glass or tempered glass. Untoughened glass is one having molten glass formed into a sheet, followed by annealing. Tempered glass is one having a compressive stress layer formed on the surface of the untoughened glass.

The tempered glass may be either physically tempered glass such as air-cooled tempered glass, or chemically tempered glass. In the case of physically tempered glass, the glass surface can be strengthened by generating a compressive stress layer on the glass surface by a temperature difference between the glass surface and the glass interior by an operation other than annealing, for example, by rapidly cooling a uniformly heated glass plate from a temperature near the softening point during bending forming.

In the case of chemically tempered glass, the glass surface can be strengthened, for example, by inducing a compressive stress on the glass surface by an ion exchange method or the like after bending forming. Further, glass that absorbs ultraviolet rays or infrared rays may be used. Furthermore, being transparent is preferred, but a glass plate having colored to such an extent that transparency is not impaired, may be used.

On the other hand, as a material for organic glass, a transparent resin, such as a polycarbonate, an acrylic resin such as polymethyl methacrylate, polyvinyl chloride, polystyrene, etc. may be mentioned.

The shape of glass plates 11 and 12 is not limited to a rectangular shape, and may be a shape formed into various shapes and curvatures. For bending and forming glass plates 11 and 12, gravity forming, press forming, roller forming, etc. may be used. Also the forming method of glass plates 11 and 12 is not particularly limited, but, for example, in the case of inorganic glass, a glass plate formed by the float method or the like is preferred.

The thickness of the glass plate 12 is not particularly limited, but, generally may be suitably selected within a range of from 0.1 mm to 10 mm, according to the type of the vehicle and location to which the laminated glass 10 is applied. The thickness of the glass plate 12 is preferably at least 0.3 mm, more preferably at least 0.5 mm, further preferably at least 0.7 mm, particularly preferably at least 1.1 mm and most preferably at least 1.6 mm, from the viewpoint of impact resistance to flying stones.

Further, also with respect to the thickness of the glass plate 11, the same as that of the glass plate 12 may be mentioned. Further, the glass plate 11 may have a different composition from that of the glass plate 12 and/or a different thickness from that of the glass plate 12. For example, the glass plate 11 may be thinner than the glass plate 12.

Further, the glass plates 11 and 12 may be flat or curved. However, if the glass plates 11 and 12 are curved and the thickness of the glass plate 11 is not appropriate, when the two pieces of glass with particularly deep bends are formed as the glass plates 11 and 12, a mismatch will be caused in the shapes of the two pieces, which will significantly affect the glass quality, such as the residual stress after compression bonding.

A coating film having a function of water-repellency, UV-cut or IR-cut, a coating film having a low-reflection property or a low-emission property, or a coating film having an anti-condensation property, may be provided on the outside of the glass plates 11 and/or 12. Further, a coating film having a function of UV-cut or IR-cut, a coating film having a low-emission property, or a coating film such as a visible light absorbing coating film or a colored coating film, may be provided on the side of the glass plates 11 and/or 12 in contact with the interlayer film 13. Further, the glass plate 11 may have a low-emissive coating on the vehicle-interior side surface thereof.

That is, glass plates 11 and/or 12 may have at least one of a water-repellent layer, a UV-blocking layer, an infrared-reflective layer, a low-reflective layer, a low-emission coating, a condensation-preventive layer, a visible light-absorbing layer and a coloring layer. It is sufficient that at least one of the glass plates 11 and/or 12, the interlayer film 13, and the substrates 151 and/or 155 of the light control element 15, has such a layer.

However, at least one of the glass plate 12, the interlayer film 132, and the substrate 155 may not have a coating layer containing a metal. The coating layer containing a metal may, specifically, be an infrared reflective layer and a low-emissive coating. The absence of the infrared reflective layer and the low-emissive coating prevents the visible light reflectance from the outside of the vehicle from becoming too high, and thus prevents the appearance of a glare.

Further, in the laminated glass 10 in such a state that the transmittance of the light control element 15 is the lowest, when the visible light reflectance on the vehicle-exterior surface of the glass plate 12 is Rout, the visible light reflectance Rout is preferably at most 8%. When the visible light reflectance Rout is at most 8%, the laminated glass 10 is less likely to have a glare appearance, regardless of the presence or absence of a coating layer containing a metal. Here, the visible light reflectance Rout of the laminated glass 10 can be measured by a method in accordance with JIS R 3106:1998. The measurements of the visible light reflectance Rout and Rin are performed on different surfaces.

When the glass plates 11 and 12 are inorganic glasses with curved shapes, the glass plates 11 and 12 are bent and formed after forming by the float method and before bonding by the interlayer film 13. Bending and forming are performed by heating the glasses to soften them. The heating temperature of the glasses during bending and forming is usually from 550° C. to 700° C.

[Interlayer Film]

For the interlayer film 13, thermoplastic resins are often used, and, for example, thermoplastic resins that have been conventionally used for this type of applications, such as plasticized polyvinyl acetal resins, plasticized polyvinyl chloride resins, saturated polyester resins, plasticized saturated polyester resins, polyurethane resins, plasticized polyurethane resins, ethylene-vinyl acetate copolymer resins, ethylene-ethyl acrylate copolymer resins, cyclo-olefin polymer resins, ionomer resins, etc., may be mentioned. Further, resin compositions containing modified block copolymer hydrides as described in Japanese Patent No. 6065221 may also be suitably used.

Among these resins, plasticized polyvinyl acetal resins are suitably used because they are excellent in balance of various properties such as transparency, weather resistance, strength, bonding strength, penetration resistance, impact energy absorption, moisture resistance, heat insulation, and sound insulation properties. These thermoplastic resins may be used alone or in combination. The term "plasticized" in the above plasticized polyvinyl acetal resins means that they are plasticized by the addition of a plasticizer. The same applies to other plasticized resins.

However, when a light control element 15 is sealed in the interlayer film 13, deterioration of the light control element may be caused by a certain plasticizer depending on the type of the light control element. In such a case, it is preferred to use a resin that practically does not contain such a plasticizer. That is, there may be a case where the interlayer film 13 does not contain a plasticizer. As a resin which does not contain a plasticizer, for example, an ethylene-vinyl acetate copolymer resin may be mentioned.

As the above polyvinyl acetal resins, a polyvinyl formal resin obtained by reacting polyvinyl alcohol (PVA) with formaldehyde, a polyvinyl acetal resin in the narrow sense obtained by reacting PVA with acetaldehyde, and a polyvinyl butyral resin (PVB) obtained by reacting PVA with n-butyl aldehyde, may be mentioned, and particularly, PVB may be mentioned to be a suitable one, because it is excellent in balance of various properties such as transparency, weather resistance, strength, bonding strength, penetration resistance, impact energy absorption, moisture resistance, heat insulation, and sound insulation properties. These polyvinyl acetal resins may be used alone or in combination of two or more types.

However, the material for forming the interlayer film 13 is not limited to a thermoplastic resin. Further, the interlayer film 13 may also contain functional particles such as infrared absorbers, ultraviolet absorbers, luminescent agents, etc. Further, the interlayer film 13 may also have a colored part so-called a shade band.

The thickness of the interlayer film 13 is preferably at least 0.5 mm at the thinnest portion. When the thickness of the thinnest portion of the interlayer film 13 is at least 0.5 mm, the impact resistance required for laminated glass will be sufficient. Further, the thickness of the interlayer film 13 is preferably at most 3 mm at the thickest portion. If the maximum value of the thickness of the interlayer film 13 is at most 3 mm, the mass of the laminated glass will not be too large. The maximum value of the thickness of the interlayer film 13 is more preferably at most 2.8 mm, and further preferably at most 2.6 mm.

Further, the interlayer film 13 may have at least four layers. For example, if the interlayer film is made up of at least four layers and the shear modulus of any layer other than both side layers is made to be smaller than the shear modulus of both side layers by e.g. adjusting the plasticizer, etc., the sound insulation property of the laminated glass 10 can be improved. In this case, the shear modulus of both side layers may be the same or different.

Further, the interlayer films 131, 132 and 133 contained in the interlayer film 13 should all be made of the same material, but some or all of the interlayer films 131, 132 and 133 may be made of different materials. In such a case, the thicknesses of the respective interlayer films 131, 132 and 133 are preferably at least 0.025 mm and at most 1 mm.

To prepare the interlayer film 13, for example, the above resin material to be an interlayer film is suitably selected and extrusion-molded in a heated molten state by using an extruder. The extrusion conditions such as the extrusion speed, etc. of the extruder are set to be uniform. Then, the extruded resin film is, for example, as the case requires, stretched to give curvature to the upper and lower edges of the resin film according to the design of the laminated glass, to complete the interlayer film 13.

[Laminated Glass]

The total thickness of the laminated glass 10 is preferably at least 2.8 mm and at most 10 mm. When the total thickness of the laminated glass 10 is at least 2.8 mm, sufficient rigidity can be secured. When the total thickness of the laminated glass 10 is at most 10 mm, a sufficient transmittance can be obtained, and the haze can be reduced.

The misalignment between the glass plate 11 and the glass plate 12 on at least one side of the laminated glass 10, is preferably at most 1.5 mm and more preferably at most 1 mm. Here, the misalignment between the glass plate 11 and the glass plate 12 is, in other words, the amount of misalignment between the edge of the glass plate 11 and the edge of the glass plate 12 in a planar view.

It is suitable for the laminated glass 10 to have a misalignment between the glass plate 11 and the glass plate 12 to be at most 1.5 mm on at least one side thereof in that its appearance will not be impaired. It is more suitable for the laminated glass 10 to have a misalignment between the glass plate 11 and the glass plate 12 to be at most 1.0 mm on at least one side thereof in that its appearance will not be impaired.

[Method for Producing Laminated Glass]

To produce laminated glass 10, a laminate is made by sandwiching an interlayer film 13 and a light control element 15 between a glass plate 11 and a glass plate 12. And, for example, this laminate is put in a rubber bag and pre-compressed at a temperature of from about 50° ° C. to 110° C. in a vacuum with a gauge pressure of from −65 kPa to −100 kPa. The heating conditions, temperature conditions, vacuum conditions, and lamination method, for the pre-compression, are suitably selected taking into consideration the properties of the light control element 15, so as not to deteriorate during lamination.

Further, by conducting a compression bonding treatment of heating and pressurizing the laminated glass 10 in an autoclave, for example, at a temperature of from 80° C. to 150° C. under an absolute pressure of from 0.6 MPa to 1.3 MPa, it is possible to obtain the laminated glass 10 more excellent in durability. In some cases, however, this heating and pressurizing process may not be used to simplify the process and to take into account the characteristics of the materials to be sealed in the laminated glass 10.

In the process of making a laminate, a first laminate may be made by attaching a light control element 15 to a glass plate 12 via an interlayer film 132, which becomes to be the vehicle-exterior portion of the interlayer film 13, and then attaching a glass plate 11 to the light control element 15 side of the first laminate via an interlayer film 131, which becomes to be the vehicle-interior portion of the interlayer film 13. In such a case, an adhesive film may be used for the interlayer film 13, and a roller may be used for the pre-compression bonding process instead of a rubber bag. The temperature and vacuum conditions are suitably selected taking into consideration the properties of the interlayer film 13 and the light control element 15 so as not to deteriorate during the lamination process. In particular, laminating at room temperature is desirable because it is possible to minimize the load exerted on the light control element 15. Further, a frame-like interlayer film 133, which is positioned between the interlayer film 131 and the interlayer film 132 and surrounds the outer circumference of the light control element 15, may also be added.

When the laminated glass 10 is curved, the glass plate 11 and the glass plate 12 may be bent and formed by a conventional bending method. For example, the glass plate 11 and the glass plate 12 may be overlaid and placed in a ring-shaped mold, heated to at least the softening point, and bent and formed by their own weight. Alternatively, the glass plate 11 and the glass plate 12 may be press-formed separately or as overlaid, in a heated state.

The method of producing laminated glass, in which pre-bent and formed glass plate 11 and glass plate 12 are bonded together via an interlayer film 13 without elastic deformation of each other, like this, is also called "hot bending".

A method called "cold bending", in which glass plate 11 and glass plane 12 are bonded in such a state that at least one of them is or both of them are elastically deformed, may be used to make the laminated glass 10. Cold bending can be achieved by using a laminate consisting of a glass plate 11, a glass plate 12, an interlayer film 13 and a light control element 15 fixed by a temporary fixing method such as a tape, a conventional pre-compression bonding device such as a nip roller, a rubber bag or a rubber chamber, and an autoclave.

Further, in addition to the interlayer film 13 and the light control element 15, a film or device having functions such as heat generation, infrared reflection, light emission, power generation, light control, touch panel, visible light reflection, scattering, decoration, absorption, etc. may be provided between the glass plate 11 and the glass plate 12, to such an extent that the effect of this application is not impaired. Further, the surface of the laminated glass 10 may also have a film having functions such as antifogging, water repellency, heat shielding, low reflection, etc. Further, the vehicle-exterior side surface of the glass plate 11 or the vehicle-interior side surface of the glass plate 12 may have a film having functions such as heat shielding, heat emission, etc.

Variation 1 of the First Embodiment

In Variation 1 of the first embodiment, an example of another method to realize the relation of Tout<Tin is shown. Here, in Variation 1 of the first embodiment, the explanations with respect to the same components as in the already explained embodiments may sometimes be omitted.

As another method to realize the relation of Tout<Tin, the transmittance of the glass plate 12 located on the vehicle-exterior side of the light control layer 153 may be made to be lower than the transmittance of the glass plate 11 located on the vehicle-interior side. Specifically, different materials may be used for the glass plate 11 and glass plate 12 so that the relation of Tout<Tin is satisfied. For example, privacy glass may be used as the glass plate 12, and green glass or clear glass may be used as the glass plate 11.

Here, green glass is a glass with high transparency. The visible light transmittance of green glass is, for example, at a level of from 83% to 88% when the thickness is from 1.6 mm to 2.0 mm. Further, clear glass is a glass with even higher transparency than green glass, and its visible light transmittance is, for example, at a level of from 88% to 92% when the thickness is from 1.8 mm to 2.0 mm.

Privacy glass is a glass with lower transparency than green glass and clear glass, and is also called dark gray glass. Privacy glass can be realized by adjusting the total iron content in terms of $Fe_2O_3$ in glass plate 12. The visible light transmittance of privacy glass can be adjusted, for example, to be at a level of from 40% to 50% for a plate thickness of 1.8 mm and at a level of from 30% to 45% for a plate thickness of 2.0 mm.

An example of the composition of privacy glass is the glass matrix composition, as expressed by mass % on oxide basis, comprising $SiO_2$: 66% to 75%, $Na_2O$: 10% to 20%, CaO: 5% to 15%, MgO: 0% to 6%, $Al_2O_3$: 0% to 5%, $K_2O$: 0% to 5%, FeO: 0.13% to 0.9%, total iron as expressed by $Fe_2O_3$: at least 0.8% and less than 2.4%, $TiO_2$: more than 1% and at most 5%, and, relative to the total amount of components in the glass matrix composition, containing CoO from 100 mass ppm to 500 mass ppm, Se from 0 mass ppm to 70 mass ppm, and $Cr_2O_3$ from 0 mass ppm to 800 mass ppm, and the combined amount of CoO, Se and $Cr_2O_3$ being less than 0.1 mass %.

Further, privacy glass is described in detail, for example, in WO 2015/088026, the contents of which are hereby incorporated by reference.

As a further another method to achieve the relation of Tout<Tin, the transmittance of the substrate 155 disposed on the vehicle-exterior side of the light control layer 153, may be made to be lower than the transmittance of the substrate 151 disposed on the vehicle-interior side. Specifically, different materials may be used for the supporting member 151a of the substrate 151 and the supporting member 155a of the substrate 155 so that the relation of Tout<Tin is satisfied. For example, a PET film with a thickness of 50 μm and a transmittance of 50% may be used as the supporting member 155a of the substrate 155, and a PET film with a thickness of 50 μm and a transmittance of 90% may be used as the supporting member 151a of the substrate 151.

Thus, in order to achieve the relation of Tout<Tin, the materials for the interlayer film 131 and the interlayer film 132 may be changed, the materials for the glass plate 11 and the glass plate 12 may be changed, or the materials for the supporting member 151a of the substrate 151 and the supporting member 155a of the substrate 155 may be changed. Or, two or more of these may be used in combination. Further, in addition to the above, the transmittance may be adjusted by changing the thickness of each layer.

However, the thickness of the glass plate 12 may be equal to the thickness of the glass plate 11. Further, the thickness of the interlayer film 131 as the vehicle-interior portion of the interlayer film 13, may be equal to the thickness of the interlayer film 132 as the vehicle-exterior portion of the interlayer film 13. Further, the thickness of the supporting member 155a of the substrate 155 disposed on the vehicle-exterior side of the light control layer 153, may be equal to the thickness of the supporting member 151a of the substrate 151 disposed on the vehicle-interior side of the light control layer 153.

Among these methods, the method of changing the materials of interlayer film 131 and interlayer film 132 is the most preferred from such a viewpoint that Tout can be made to be a lower value. Further, in a case where the materials of the glass plate 11 and the glass plate 12 are changed, the compositions of the glass plate 11 and the glass plate 12 cannot be made to be the same, whereby the bending conditions of the two plates are different. Therefore, when the glass plate 11 and the glass plate 12 have curved shapes, it is difficult to bend the glass plate 11 and the glass plate 12 with enough shape accuracy to easily prepare the laminated glass 10. In a case where the materials of interlayer film 131 and interlayer film 132 are changed, the compositions of the glass plate 11 and the glass plate 12 may be made to be the same, and the bending conditions of both plates may be made to be the same, whereby the production of laminated glass 10 will be easy. Also from this point of view, the construction in which the materials of the interlayer film 131 and the interlayer film 132 are different is also preferred.

EXAMPLES

In the following, Examples will be described, but the present invention is not limited to these Examples in any way.

(Ex. 1)

Green glass with dimensions of 1,000 mm (length)×1,200 mm (width)×2 mm (thickness) was prepared as the glass plate 11 (vehicle-interior side glass plate) and the glass plate 12 (vehicle-exterior side glass plate). Further, PVB film RK11 (manufactured by Solutia Japan Ltd.) with dimensions of 1,000 mm (length)×1,200 mm (width)×0.38 mm (film thickness) was prepared as the interlayer film 131. Further, PVB film 7018 (manufactured by Sekisui Chemical Co., Ltd.) with dimensions of 1,000 mm (length)×1,200 mm (width)×0.76 mm (film thickness) was prepared as the interlayer film 132. Further, a polymer dispersed liquid crystal (PDLC) film was prepared as the light control element 15. Further, in the light control element 15, the supporting members 151a and 155a are both PET films with a thickness of 50 µm and a transmittance of 90%. Further, the conductive films 151b and 155b were made of ITO with a sheet resistance of 80 Ω/sq.

Next, a laminate was made by sandwiching the interlayer film 131, the light control element 15, and the interlayer film 132 between the glass plate 11 and the glass plate 12. And, the laminate was put in a rubber bag and bonded at a temperature of from about 70° C. to 110° C. in a vacuum with a gauge pressure of from −65 kPa to −100 kPa, to prepare laminated glass for evaluation having a layer structure shown in FIG. 1B.

Further, the transmittance T1 of glass plate 12, transmittance T2 of interlayer film 132, transmittance T3 of substrate 155, transmittance T4 of substrate 151, transmittance T5 of interlayer film 131, and transmittance T6 of glass plate 11 were measured, and Tout=T1×T2×T3, and Tin=T4×T5×T6 were calculated. Further, the total light transmittance T of the laminated glass for evaluation at the lowest transmittance of the light control element and the visible light reflectance Rin on the vehicle-interior side surface of the glass plate 11 were measured, and T/Rin was calculated.

Here, the transmittance T1 of the glass plate 12 and the transmittance T6 of the glass plate 11 were measured as the total light transmittance of the glass plate alone. For the transmittance T2 of the interlayer film 132 and the transmittance T5 of the interlayer film 131, because it is difficult to measure the transmittance of the interlayer film alone, laminated glass was prepared by using 2 sheets of clear glass with a thickness of 2 mm, and its total light transmittance was measured. For the transmittance T3 of the substrate 155 and the transmittance T4 of the substrate 151, the total light transmittance of the substrate alone was measured.

(Ex. 2)

Laminated glass for evaluation was prepared in the same manner as in Ex. 1, except that PVB film RK11 (manufactured by Solutia Japan Ltd.) with dimensions of 1,000 mm (length)×1,200 mm (width)×0.38 mm (film thickness) was used as the interlayer film 132.

(Ex. 3)

Laminated glass for evaluation was prepared in the same manner as in Ex. 1, except that PVB film 7018 (manufactured by Sekisui Chemical Co., Ltd.) with dimensions of 1,000 mm (length)×1,200 mm (width)×0.76 mm (film thickness) was used as the interlayer film 131.

(Ex. 4)

Laminated glass for evaluation was prepared in the same manner as in Ex. 1, except that PVB film 7018 (manufactured by Sekisui Chemical Co., Ltd.) with dimensions of 1,000 mm (length)×1,200 mm (width)×0.76 mm (film thickness) was used as the interlayer film 131, and PVB film RK11 (manufactured by Solutia Japan Ltd.) with dimensions of 1,000 mm (length)×1,200 mm (width)×0.38 mm (film thickness) was used as the interlayer film 132.

(Ex. 5)

Laminated glass for evaluation was prepared in the same manner as in Ex. 1, except that PVB film SL47-5208 (manufactured by Solutia Japan Ltd.) with dimensions of 1,000 mm (length)×1,200 mm (width)×0.76 mm (film thickness) was used as the interlayer film 132.

(Ex. 6)

Laminated glass for evaluation was prepared in the same manner as in Ex. 1 except that privacy glass with dimensions of 1,000 mm (length)×1,200 mm (width)×2 mm (thickness) was used as the glass plate 12, and PVB film RK11 (manufactured by Solutia Japan Ltd.) with dimensions of 1,000 mm (length)×1,200 mm (width)×0.38 mm (film thickness) was used as the interlayer film 132.

(Ex. 7)

Laminated glass for evaluation was prepared in the same manner as in Ex. 1 except that PVB film RK11 (manufactured by Solutia Japan Ltd.) with dimensions of 1,000 mm (length)×1,200 mm (width)×0.38 mm (film thickness) was used as the interlayer film 132, and PET film with a thickness of 50 µm and a transmittance of 50% was used as the supporting member 155a of the light control element 15.

(Ex. 8)

Laminated glass for evaluation was prepared in the same manner as in Ex. 1 except that privacy glass with dimensions of 1,000 mm (length)×1,200 mm (width)×2 mm (thickness) was used as the glass plate 11 and glass plate 12, and PVB film 7018 (manufactured by Sekisui Chemical Co., Ltd.) with dimensions of 1,000 mm (length)×1,200 mm (width)×0.76 mm (film thickness) was used as the interlayer film 132.

(Evaluation 1)

Figure 3:
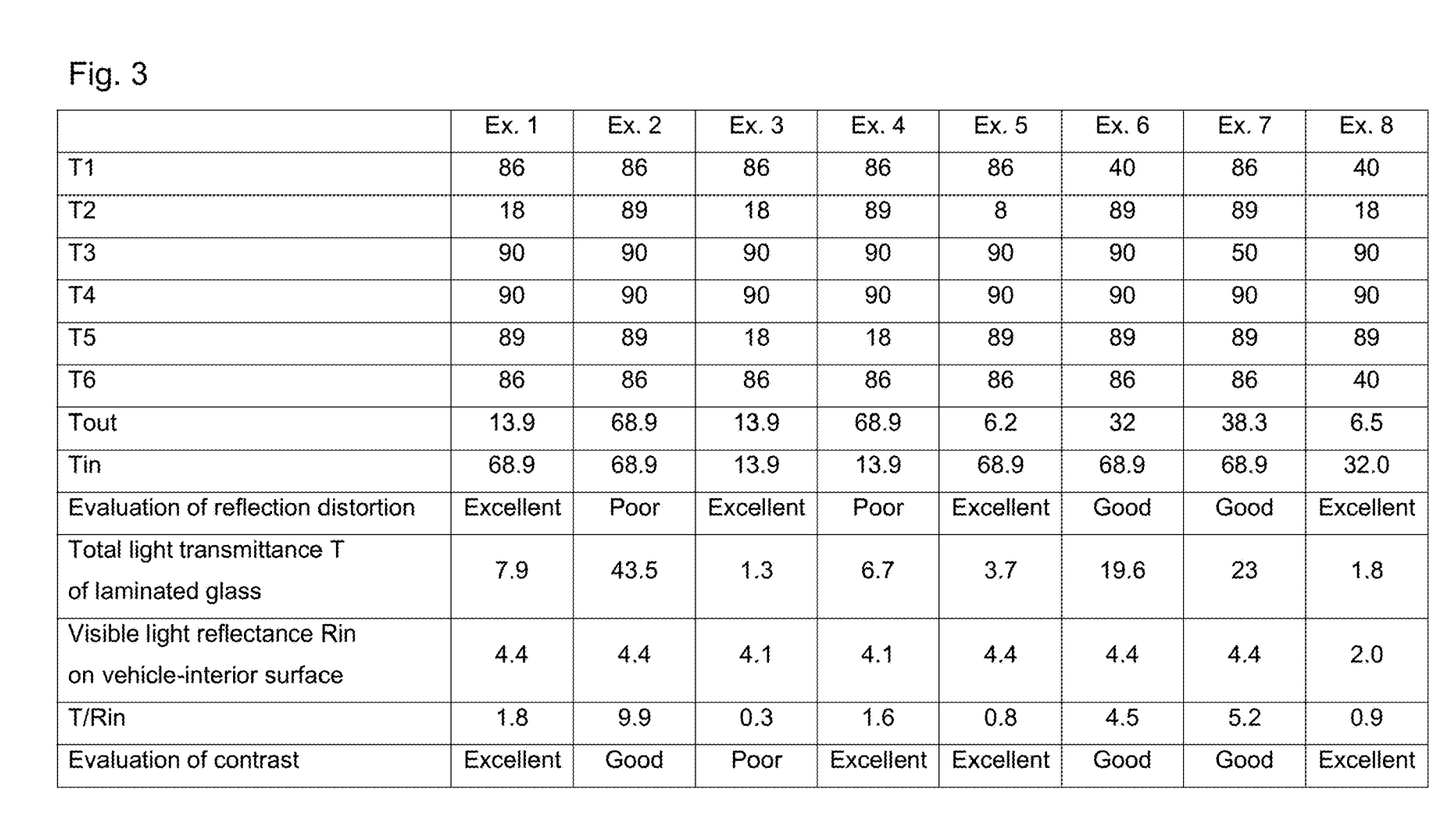
FIG. 3 is an illustration of Examples.

With respect to each of the laminated glass products for evaluation prepared in Ex. 1 to Ex. 8, evaluation of the appearance was conducted. Specifically, the laminated glass for evaluation was placed horizontally in a room, and a zebra board (a series of alternating white and black straight lines of 30 mm in thickness) was reflected at an angle of 45 degrees from the vehicle-exterior side, and the reflected image of the zebra board by the laminated glass, was photographed. The photographing was conducted by using D5300 manufactured by Nikon Corporation and, as a lens, 18-55 mm f/3.5-5.6G at a resolution of 2,992×2,000 pixels at 300 dpi. The number of pixels of the photographs taken was counted by reading the number of pixels in the area where the line width of the zebra board changed from the normal line width. A case where the number of pixels of the area where the line width of the zebra board is changed from the normal line width is less than 200,000, was considered to be "excellent", and a case where the number is at least 200,000 and less than 1,200,000, was considered to be "good" and a case where the number is at least 1,200,000 was considered to be "poor". In this evaluation, the amount of deviation from the normal linewidth of the zebra board is evaluated as the amount of good or bad reflection distortion. The evaluation results are shown in FIG. 3 together with the values of Tout, Tin, T/Rin, etc.

(Evaluation 2)

With respect to each of the laminated glass products for evaluation prepared in Ex. 1 to Ex. 8, evaluation of the contrast was conducted. Specifically, the laminated glass for evaluation was set at the roof glass position of a car, and by looking diagonally forward from the rear seat, the contrast at the time of turning on/off the light control element 15, was confirmed. Ten persons with visual acuity of 1.5 or better were arbitrarily selected as evaluators. When all the evaluators felt that sufficient contrast was obtained, the contrast was considered to be good, and when even one of them felt that insufficient contrast was obtained, the contrast was considered to be poor. Furthermore, among the good results, when all the evaluators felt that the light-shielding property was sufficiently obtained, the result was classified as excellent. The evaluation results are shown in FIG. 3, together with the values of Tout, Tin, T/Rin, etc.

(Evaluation Results)

The results in FIG. 3 show that when the relation of Tout<Tin is satisfied, it is possible to suppress the occurrence of severe reflection distortion when viewed from outside the vehicle. In particular, when Tout is at most 20%, the reflection distortion becomes to be not visible, such being desirable. Since the reflection distortion in the vehicle-exterior view is aggravated by the undulation of the light control layer and conductive film of the light control element, it is less noticeable when the transmittance on the vehicle-exterior side is lower than the light control element.

Further, the results in FIG. 3 show that when the relation of 0.5<T/Rin<10 is satisfied, the contrast is obtainable to some extent, but as in Ex. 3, when T/Rin is at most 0.5, the contrast tends to be not sufficiently obtainable. Thus, when the transmittance is too low, the contrast is deteriorated because the reflection from the vehicle-interior surface side becomes dominant. On the other hand, if the transmittance is too high, the contrast is deteriorated because the light shielding property of the light control element in the off state is low, and it is difficult to see the difference from the on state.

As described above, it is preferred to satisfy the relation of Tout<Tin and to further satisfy the relation of 0.5<T/Rin<10, and when these conditions are met, it is possible to suppress reflection distortion in the vehicle-exterior view and to obtain a contrast to some extent. In particular, when Tin is at least 60%, and Tout is at most 20%, and further the relation of 0.5<T/Rin<10 is satisfied, the reflection distortion in the vehicle-exterior view tends to be not visible, and a good contrast is obtainable. Further, when the relation of 0.5<T/Rin<2 is satisfied, a good light shielding property is obtainable.

In the foregoing, preferred embodiments, etc. have been described in detail, but without being limited to the above described embodiments, etc., various modifications and substitutions can be added to the above described embodiments, etc., without departing from the scope of the claims.

REFERENCE SYMBOLS

10: Laminated glass
11, 12: Glass plate
13, 131, 132, 133: Interlayer film
14: Shielding layer
15: Light control element
18: Low-emissive coating
151, 155: Substrate
151a, 155a: Supporting member
151b, 155b: Conductive film
153: Light control layer
156: Electrode

What is claimed is:

1. A laminated glass for vehicles, comprising:
an interior glass plate and an exterior glass plate,
an interlayer film located between the interior glass plate and the exterior glass plate, and
a light control element sealed in the interlayer film, wherein
the light control element has a pair of substrates and a light control layer located between the pair of substrates,
the interlayer film includes an interior portion located on the vehicle-interior side, of the light control layer, and an exterior portion located on the vehicle-exterior side, of the light control layer,
when the transmittance of the exterior glass plate, the exterior portion of the interlayer film, and the substrate located on the vehicle-exterior side, of the light control layer, is Tout, and the transmittance of the interior glass plate, the interior portion of the interlayer film, and the substrate located on the vehicle-interior side, of the light control layer, is Tin, a relation of Tout<Tin is satisfied, and
the difference between Tin and Tout is at least 20%.

2. The laminated glass according to claim 1, wherein the transmittance of the exterior portion of the interlayer film is lower than the transmittance of the interior portion of the interlayer film.

3. The laminated glass according to claim 1, wherein the transmittance of the exterior glass plate is lower than the transmittance of the interior glass plate.

4. The laminated glass according to claim 1, wherein the transmittance of the substrate located on the vehicle-exterior side, of the light control layer, is lower than the transmittance of the substrate located on the vehicle-interior side, of the light control layer.

5. The laminated glass according to claim 1, wherein the haze of the light control element is at least 80% in a state where the transmittance of the light control element is the lowest.

6. The laminated glass according to claim 1, wherein the Tin is at least 30%.

7. The laminated glass according to claim 1, wherein the Tin is at least 60%.

8. The laminated glass according to claim 1, wherein the transmittance of the interior portion of the interlayer film is at least 80%.

9. The laminated glass according to claim 1, wherein the thickness of the exterior glass plate is equal to the thickness of the interior glass plate.

10. The laminated glass according to claim 1, wherein the thickness of the exterior portion of the interlayer film is equal to the thickness of the interior portion of the interlayer film.

11. The laminated glass according to claim 1, wherein the thickness of the substrate located on the vehicle-exterior side, of the light control layer, is equal to the thickness of the substrate located on the vehicle-interior side, of the light control layer.

12. The laminated glass according to claim 1, wherein the Tout is at least 0.01% and at most 20%.

13. The laminated glass according to claim 1, wherein the total light transmittance of the laminated glass is at least 2% and at most 10% in a state where the transmittance of the light control element is the lowest.

14. The laminated glass according to claim 1, wherein when the total light transmittance of the laminated glass in a state where the transmittance of the light control element is the lowest, is T, and the visible light reflectance at the vehicle-interior side surface of the interior glass plate is Rin, a relation of 0.5<T/Rin<10 is satisfied.

15. The laminated glass according to claim 14, wherein the Rin is less than 2.5%.

16. The laminated glass according to claim 1, wherein the exterior glass plate does not have an infrared reflective layer nor a low-emissive coating.

17. The laminated glass according to claim 1, wherein the substrate located on the vehicle-exterior side, of the light control layer, does not have an infrared reflective layer nor a low-emissive coating.

18. The laminated glass according to claim 1, wherein at least one of the interior glass plate, the exterior glass plate, the interlayer film, and the pair of substrates, has at least one of an infrared reflective layer, a low-emissive coating, a water-repellent layer, a condensation-guard layer, and a UV-blocking layer.

19. The laminated glass according to claim 18 having a low-emissive coating on the vehicle-interior side surface of the interior glass plate.

20. The laminated glass according to claim 1, wherein when the visible light reflectance on the vehicle-exterior side surface of the exterior glass plate, of the laminated glass in a state where the transmittance of the light control element is the lowest, is Rout, Rout is at most 8%.

21. The laminated glass according to claim 1, wherein the light control layer is any one selected from the group consisting of a suspended particle device, a polymer dispersed liquid crystal, a polymer network liquid crystal, a guest-host type liquid crystal and an electrochromic device.

22. The laminated glass according to claim 1, wherein the surface of the pair of substrates in contact with the light control layer, has a transparent barrier layer.

23. A laminated glass for vehicles, comprising:
an interior glass plate and an exterior glass plate,
an interlayer film located between the interior glass plate and the exterior glass plate, and
a light control element sealed in the interlayer film, wherein
the light control element has a pair of substrates and a light control layer located between the pair of substrates,
the interlayer film includes an interior portion located on the vehicle-interior side, of the light control layer, and an exterior portion located on the vehicle-exterior side, of the light control layer,
when the transmittance of the exterior glass plate, the exterior portion of the interlayer film, and the substrate located on the vehicle-exterior side, of the light control layer, is Tout, and the transmittance of the interior glass plate, the interior portion of the interlayer film, and the substrate located on the vehicle-interior side, of the light control layer, is Tin, a relation of Tout<Tin is satisfied, and
the Tout is at least 0.01% and at most 20%.

24. The laminated glass according to claim 23, wherein the transmittance of the exterior portion of the interlayer film is lower than the transmittance of the interior portion of the interlayer film.

25. The laminated glass according to claim 23, wherein the transmittance of the exterior glass plate is lower than the transmittance of the interior glass plate.

26. The laminated glass according to claim 23, wherein the transmittance of the substrate located on the vehicle-exterior side, of the light control layer, is lower than the transmittance of the substrate located on the vehicle-interior side, of the light control layer.

27. The laminated glass according to claim 23, wherein the haze of the light control element is at least 80% in a state where the transmittance of the light control element is the lowest.

28. The laminated glass according to claim 23, wherein the Tin is at least 30%.

29. The laminated glass according to claim 23, wherein the Tin is at least 60%.

30. The laminated glass according to claim 23, wherein the transmittance of the interior portion of the interlayer film is at least 80%.

31. The laminated glass according to claim 23, wherein the thickness of the exterior glass plate is equal to the thickness of the interior glass plate.

32. The laminated glass according to claim 23, wherein the thickness of the exterior portion of the interlayer film is equal to the thickness of the interior portion of the interlayer film.

33. The laminated glass according to claim 23, wherein the thickness of the substrate located on the vehicle-exterior side, of the light control layer, is equal to the thickness of the substrate located on the vehicle-interior side, of the light control layer.

34. The laminated glass according to claim 23, wherein the total light transmittance of the laminated glass is at least 2% and at most 10% in a state where the transmittance of the light control element is the lowest.

35. The laminated glass according to claim 23, wherein when the total light transmittance of the laminated glass in a state where the transmittance of the light control element is the lowest, is T, and the visible light reflectance at the vehicle-interior side surface of the interior glass plate is Rin, a relation of 0.5<T/Rin<10 is satisfied.

36. The laminated glass according to claim 35, wherein the Rin is less than 2.5%.

37. The laminated glass according to claim 23, wherein the exterior glass plate does not have an infrared reflective layer nor a low-emissive coating.

38. The laminated glass according to claim 23, wherein the substrate located on the vehicle-exterior side, of the light control layer, does not have an infrared reflective layer nor a low-emissive coating.

39. The laminated glass according to claim 23, wherein at least one of the interior glass plate, the exterior glass plate, the interlayer film, and the pair of substrates, has at least one of an infrared reflective layer, a low-emissive coating, a water-repellent layer, a condensation-guard layer, and a UV-blocking layer.

40. The laminated glass according to claim 39, having a low-emissive coating on the vehicle-interior side surface of the interior glass plate.

41. The laminated glass according to claim 23, wherein when the visible light reflectance on the vehicle-exterior side surface of the exterior glass plate, of the laminated glass in a state where the transmittance of the light control element is the lowest, is Rout, Rout is at most 8%.

42. The laminated glass according to claim 23, wherein the light control layer is any one selected from the group consisting of a suspended particle device, a polymer dispersed liquid crystal, a polymer network liquid crystal, a guest-host type liquid crystal and an electrochromic device.

43. The laminated glass according to claim 23, wherein the surface of the pair of substrates in contact with the light control layer, has a transparent barrier layer.

44. A laminated glass for vehicles, comprising:
an interior glass plate and an exterior glass plate,
an interlayer film located between the interior glass plate and the exterior glass plate, and a light control element sealed in the interlayer film, wherein the light control element has a pair of substrates and a light control layer located between the pair of substrates, the interlayer film includes an interior portion located on the vehicle-interior side, of the light control layer, and an exterior portion located on the vehicle-exterior side, of the light control layer, when the transmittance of the exterior glass plate, the exterior portion of the interlayer film, and the substrate located on the vehicle-exterior side, of the light control layer, is Tout, and the transmittance of the interior glass plate, the interior portion of the interlayer film, and the substrate located on the vehicle-interior side, of the light control layer, is Tin, a relation of Tout<Tin is satisfied, and wherein when the visible light reflectance on the vehicle-exterior side surface of the exterior glass plate, of the laminated glass in a state where the transmittance of the light control element is the lowest, is Rout, Rout is at most 8%.

45. The laminated glass according to claim 44, wherein the transmittance of the exterior portion of the interlayer film is lower than the transmittance of the interior portion of the interlayer film.

46. The laminated glass according to claim 44, wherein the transmittance of the exterior glass plate is lower than the transmittance of the interior glass plate.

47. The laminated glass according to claim 44, wherein the transmittance of the substrate located on the vehicle-exterior side, of the light control layer, is lower than the transmittance of the substrate located on the vehicle-interior side, of the light control layer.

48. The laminated glass according to claim 44, wherein the haze of the light control element is at least 80% in a state where the transmittance of the light control element is the lowest.

49. The laminated glass according to claim 44, wherein the Tin is at least 30%.

50. The laminated glass according to claim 44, wherein the Tin is at least 60%.

51. The laminated glass according to claim 44, wherein the transmittance of the interior portion of the interlayer film is at least 80%.

52. The laminated glass according to claim 44, wherein the thickness of the exterior glass plate is equal to the thickness of the interior glass plate.

53. The laminated glass according to claim 44, wherein the thickness of the exterior portion of the interlayer film is equal to the thickness of the interior portion of the interlayer film.

54. The laminated glass according to claim 44, wherein the thickness of the substrate located on the vehicle-exterior side, of the light control layer, is equal to the thickness of the substrate located on the vehicle-interior side, of the light control layer.

55. The laminated glass according to claim 44, wherein the total light transmittance of the laminated glass is at least 2% and at most 10% in a state where the transmittance of the light control element is the lowest.

56. The laminated glass according to claim 44, wherein when the total light transmittance of the laminated glass in a state where the transmittance of the light control element is the lowest, is T, and the visible light reflectance at the vehicle-interior side surface of the interior glass plate is Rin, a relation of 0.5<T/Rin<10 is satisfied.

57. The laminated glass according to claim 56, wherein the Rin is less than 2.5%.

58. The laminated glass according to claim 44, wherein the exterior glass plate does not have an infrared reflective layer nor a low-emissive coating.

59. The laminated glass according to claim 44, wherein the substrate located on the vehicle-exterior side, of the light control layer, does not have an infrared reflective layer nor a low-emissive coating.

60. The laminated glass according to claim 44, wherein at least one of the interior glass plate, the exterior glass plate, the interlayer film, and the pair of substrates, has at least one of an infrared reflective layer, a low-emissive coating, a water-repellent layer, a condensation-guard layer, and a UV-blocking layer.

61. The laminated glass according to claim 60 having a low-emissive coating on the vehicle-interior side surface of the interior glass plate.

62. The laminated glass according to claim 44, wherein the light control layer is any one selected from the group consisting of a suspended particle device, a polymer dispersed liquid crystal, a polymer network liquid crystal, a guest-host type liquid crystal and an electrochromic device.

63. The laminated glass according to claim 44, wherein the surface of the pair of substrates in contact with the light control layer, has a transparent barrier layer.

* * * * *